US012568893B2

(12) United States Patent
Abeles

(10) Patent No.: US 12,568,893 B2
(45) Date of Patent: Mar. 10, 2026

(54) TAPERED SEED PLANTING DEVICES FOR ENABLING WATER AND VEGETATION TO PENETRATE A HYDROPHOBIC LAYER AFTER A FOREST FIRE

(71) Applicant: VIRIDIS ARBOR LLC, Verona, NJ (US)

(72) Inventor: Gary E. Abeles, Verona, NJ (US)

(73) Assignee: VIRIDIS ARBOR LLC, Verona, NJ (US)

( * ) Notice: Subject to any disclaimer, the term of this patent is extended or adjusted under 35 U.S.C. 154(b) by 0 days.

(21) Appl. No.: 19/222,317

(22) Filed: May 29, 2025

(65) Prior Publication Data

US 2025/0287882 A1 Sep. 18, 2025

Related U.S. Application Data

(63) Continuation-in-part of application No. 18/700,343, filed as application No. PCT/US2022/042322 on Sep. 1, 2022.

(Continued)

(51) Int. Cl.
*A01G 9/029* (2018.01)
*A01G 17/00* (2006.01)
*A01G 23/00* (2006.01)

(52) U.S. Cl.
CPC ........... *A01G 9/0291* (2018.02); *A01G 9/029* (2018.02); *A01G 17/00* (2013.01); *A01G 17/005* (2013.01); *A01G 23/00* (2013.01)

(58) Field of Classification Search
CPC .... A01G 9/0291; A01G 9/0295; A01C 14/00; B64D 1/12; B64U 2101/40
See application file for complete search history.

(56) References Cited

U.S. PATENT DOCUMENTS 2,394,192 A * 2/1946 Mann ........................ A01G 9/02
47/1.01 R
4,031,832 A * 6/1977 Edwards .............. A01C 11/006
47/73

(Continued)

FOREIGN PATENT DOCUMENTS

KR 20140068414 A * 6/2014 ........... A01G 9/0293

OTHER PUBLICATIONS

Translation of KR20140068414A (Year: 2014).*

*Primary Examiner* — Kimberly S Berona
*Assistant Examiner* — Steven J Shur
(74) *Attorney, Agent, or Firm* — Maine Cernota & Curran

(57) ABSTRACT

A device and method for introducing new vegetation into a forest floor includes seeds, seedlings, and/or saplings carried within a plurality of tapered shells having polygonal cross sections, possibly mixed with soil, sand, gravel, fertilizer, SAP granules, and/or water. The tapered shells are inserted into the ground through the hydrophobic layer by dropping or propelling them from an aircraft, or manually pressing on them. One or more holes proximate the bottoms of the tapered shells enable rain water and germinating roots to penetrate into soil beneath the hydrophobic layer. A perforated lid can prevent the seeds or seedlings from being ejected upon impact with the forest floor. A weighted tip can improve penetration of the tapered shells into the forest floor. A plurality of tapered shells can extend downward from a tray or frame. The tapered shell and/or perforated lid can be made from biodegradable materials.

20 Claims, 13 Drawing Sheets

Fig. 3

Related U.S. Application Data

(60) Provisional application No. 63/272,960, filed on Oct. 28, 2021.

(56) References Cited

U.S. PATENT DOCUMENTS

| | | | |
|---|---|---|---|
| 4,347,686 A * | 9/1982 | Wood ................... | A01G 9/0291 |
| | | | 47/73 |
| 2019/0116719 A1* | 4/2019 | Fletcher ................... | B64D 1/16 |

* cited by examiner

604

208

602

600

606

202

206

TAPERED SEED PLANTING DEVICES FOR ENABLING WATER AND VEGETATION TO PENETRATE A HYDROPHOBIC LAYER AFTER A FOREST FIRE

RELATED APPLICATIONS

This application is a continuation in part of U.S. application Ser. No. 18/700,343, filed on Apr. 11, 2024. application Ser. No. 18/700,343 is a national phase application filed under 35 USC § 371 of PCT Application No. PCT/US2022/42322 with an international filing date of Sep. 1, 2022. PCT Application PCT/US2022/42322 claims the benefit of U.S. Provisional Application No. 63/272,960, filed Oct. 28, 2021. All of these applications are incorporated herein by reference in their entirety for all purposes.

FIELD OF THE INVENTION

The invention relates to restoration of a forest after a forest fire, and more particularly, to preventing mudslides and introducing new vegetation into a forest floor after a forest fire.

BACKGROUND OF THE INVENTION

Ecological recovery after a forest fire has always been a challenge, especially in heavily vegetated areas that are unpopulated, or only sparsely populated. Furthermore, recent trends in global climate change have resulted in consistently higher temperatures and persistent droughts in many areas, which in turn have increased the risks and the occurrences of major fires in wilderness and other sparsely populated areas. In particular, fifteen of the largest wildfires that have ever been recorded in the United States have occurred within the past ten years.

With reference to FIG. 1, during intense forest fires, a waxy substance derived from the burning plant material is formed. Initially created as a gas, this substance penetrates into the topsoil and then hardens, creating what is called a "hydrophobic layer" 102 above the underlying layer of normal soil 104. This hydrophobic layer 102 prevents rainwater from sinking into the ground and reaching the underlying soil 104 that would otherwise be able to absorb the water. A thin layer of ash 100 may be formed on top of the hydrophobic layer 102, but is insufficient to absorb rain water falling onto a mountain or other sloping surface after a forest fire, so that the rainwater has no choice but to flow downhill primarily on top of the hydrophobic layer 102, carrying with it the layer of ash 100 and any debris that it may encounter, as well as any normal soil that it flows over. The result is what is commonly referred to as a mudslide.

Often, in the aftermath of a forest fire, an effort is made to stabilize the soil 104 by introducing new ground cover 106 into the area, typically by dropping seeds onto the burned-over ground that will hopefully take root and reduce the likelihood and/or severity of mudslides. However, the roots of the new vegetation 106 have difficulty penetrating through the hard hydrophobic layer 102, which means that, typically, the roots will be mainly on the surface of the ground above the hydrophobic layer 102. The new vegetation 106 will therefore be poorly anchored to the ground, and easily carried away with flowing rainwater, becoming part of a mudslide.

It should be noted that, for ease of expression, the term "forest" is used generically herein to refer to any heavily vegetated area that is a wilderness area, an otherwise unpopulated area, or a sparsely populated area, whether or not the vegetation is primarily trees, and the term "forest fire" is used generically herein to refer to any fire that takes place in such a heavily vegetated area. The terms "trees" and "ground cover" are used herein to refer to any type of vegetation that is relatively large and relatively small, respectively.

What is needed, therefore, is an apparatus and method for increasing absorption of rainwater into soil after a forest fire, and for introducing new ground cover into an area that has experienced a forest fire, such that rainwater runoff will be reduced and the new ground cover will effectively stabilize the soil, thereby reducing the threat of mudslides and consequent erosion of the land.

SUMMARY OF THE INVENTION

The present invention is an apparatus and method for increasing absorption of rainwater into soil below a hydrophobic layer after a forest fire, and for introducing new ground cover into an area that has experienced a forest fire, thereby reducing the threat of mudslides and consequent erosion of the land.

In embodiments, the disclosed apparatus is a seed planting device that comprises a tapered outer shell having a polygonal cross-section that surrounds a longitudinal axis of the tapered shell, the polygonal cross-section of the tapered shell being largest at a proximal end thereof, tapering to a smallest cross-section at a distal end thereof. In embodiments, the cross-sectional polygon shape is symmetric about the longitudinal axis. In some embodiments, the distal end of the tapered shell is a point. As the seed planting device penetrates through the hydrophobic layer, the polygonal cross-sectional shape of the tapered shell focuses the lateral force applied to the hydrophobic layer into concentrated regions proximate the radially outward extending corners of the tapered shell, thereby fracturing and breaking through the hydrophobic layer with greater efficiency.

One or more seeds and/or small, germinated seedlings or saplings are included within the disclosed tapered shell. In embodiments, the seeds and/or seedlings and/or saplings are included in a seed and soil mixture, which can include any combination of soil, sand, gravel, water, and/or nutrients (i.e. fertilizer). Super-absorbent polymer (SAP) granules can also be included in the seed and soil mixture, so that the germinated vegetation will be better able to survive extended periods of dry weather. In embodiments, the SAP is a non-synthetic, biodegradable, eco-friendly polymer or eco-friendly bio-polymer.

Water can also be included within the tapered shell, so as to increase the weight of the seed planting device and further promote germination and growth of the contained seed(s) and/or seedling(s) and/or saplings. The water can be contained between frangible, water-impermeable barriers within the tapered shell above the seed and soil mixture, and can be configured to fracture upon energetic impact of the seed planting device with the forest floor, thereby allowing the water to flow downward from the reservoir into the seed and soil mixture.

At least one opening is provided at or near the bottom of the tapered shell through which water can seep and roots can emerge, the holes nevertheless being small enough to prevent significant loss of the seeds, seedlings, saplings, and/or seed and soil mixture before the tapered shell is deployed.

It should be noted that, for ease of expression, the phrase "seed and soil mixture" is used herein to refer to one or more seeds and/or seedlings and/or saplings mixed with any combination of other materials, such as sand, gravel, water, super-absorbent polymer (SAP) granules, and/or nutrients (i.e. fertilizer). It should also be noted that term super-absorbent polymer (SAP) is used herein to refer to a polymer that is able to absorb at least 200 times its weight of water. It should further be noted that, unless otherwise required by context, the term "tapered shell" is used herein to refer generically to all embodiments of the disclosed tapered shell, whether the tapered shell is shaped in cross section as a square, triangle, star, or in any other polygonal shape.

In some embodiments of the disclosed method, the seed planting devices are treated as projectiles, wherein in the aftermath of a forest fire a plurality of the seed planting devices are dropped or propelled onto and into the forest floor from an aircraft, such as a piloted helicopter, a remote-controlled winged aircraft, or a remotely controlled drone. The aircraft can include a global positioning system and/or a wind direction and speed sensor so as to more accurately drop or propel the seed planting devices to the desired locations.

Due to the shape and weight of the seed planting devices, in embodiments they impact the forest floor with sufficient energy to penetrate into the ground through the hydrophobic layer. In some of these embodiments, the impact energy of the tapered shells is entirely derived from gravitational acceleration after the seed planting devices are released from the aircraft, while in other of these embodiments the seed planting devices are energetically propelled from the aircraft, for example by a compressed gas and/or a chemical explosive.

In some embodiments the tapered shell is terminated by a weighted and hardened tip that is designed to provide additional weight, energy, and penetrating power to the seed planting device. In some of these embodiments, the tip is designed to be pushed away from the tapered shell by roots of the germinating vegetation and/or to rapidly biodegrade after impact with the forest floor, thereby providing an opening in the bottom of the tapered shell through which water and roots can penetrate.

In other embodiments of the disclosed method, the seed planting devices are pressed into the soil by personnel on the ground. In some of these embodiments, a plurality of the seed planting devices are mounted to a tray, such that the tapered shells extend below the tray. The tray can then be placed on the ground and the tapered shells can be simultaneously pressed onto the soil, for example by stepping on the tray. The tray can be configured to release the seed planting devices when the tray is lifted from the ground after the seed planting devices have been deployed.

In various other embodiments, a seed planting assembly comprises a plurality of tapered shells mounted such that they all extend downward from a common frame, while the tops of the tapered shells extend to openings through the common frame. In some of these embodiments, the individual tapered shells do not contain seeds or seedlings. Instead, a single seed or seedling, or sapling, or a plurality of seeds, seedlings and/or saplings, are included in a seed and soil mixture provided in an upper compartment that extends upward from the frame.

In embodiments, the weight of the seed planting assembly is sufficient to cause all of the tapered shells to penetrate through the hydrophobic layer when dropped from an aircraft, due to gravity and/or ballistic propulsion. Some of these embodiments enable larger plants to be established, such as saplings that are intended to replace the burned trees of the forest, because the roots of the plant can extend simultaneously through all of the plurality of tapered shells, thereby establishing a larger root system than might be possible for a plant that is germinated within a single seed planting device.

As a result of the penetration of the seed planting assemblies into the soil, holes are "punched" by the tapered shells through the hydrophobic layer, thereby providing a path for rainwater to seep into the tapered shells and through the openings near the bottom of the tapered shells into the water-absorbent soil that is beneath the hydrophobic layer.

Furthermore, upon germination of the seeds and/or maturation of the seedlings within each tapered shell or upper chamber, the roots of the new ground cover grow out through the openings near the bottom of the tapered shell and into the soil that is beneath the hydrophobic layer, thereby anchoring the new foliage to the underlying soil so that it cannot be easily washed away by flowing surface water or mud.

In embodiments, the disclosed seed planting device, or the upper chamber of the disclosed seed planting assembly, includes a perforated or porous lid or screen that is fixed in position above the contained seed and soil mixture. For example, the lid can be a wire mesh or a porous fabric such as burlap or coir. The openings in the lid are small enough to prevent any significant quantity of the seed and soil mixture from being ejected through the lid upon impact of the seed planting device with the forest floor, while being large enough to allow rainwater to pass through the lid. As the new ground cover germinates and grows, it either passes through the openings in the lid, or it bursts through the lid, if the lid is made from a frangible material such as a perforated sheet of cellulose.

The lid can be fixed to the tapered shell of a seed planting device by any attachment means known in the art, including by an adhesive, by fasteners such as rivets or screws, by press-fit, and/or by tabs that extend into indentations provided in the tapered shell. In some embodiments the lid is spaced above the upper surface of the seed and soil mixture, and thereby provides partial shade to newly germinated seedlings or saplings until they have grown sufficiently to pierce or pass through the lid.

In embodiments, the tapered shells and/or lids are made from one or more biodegradable materials, such as from AshCrete™ (a concrete alternative comprising a mixture of fly ash, borate, bottom ash, and a chlorine compound), hempcrete clay, Timbercrete™ (a masonry product containing a blend of cellulose, cement, sand, and binders), bamboo, recycled wood, coir, and/or other recycled materials, so that after the danger of mudslides has abated and the new vegetation has been established, the tapered shells and lids biodegrade and blend into the soil.

A first general aspect of the present invention is a seed planting device that includes a tapered shell extending downward along a vertical length thereof from a proximal top to a distal bottom, wherein a horizontal cross-sectional shape of the tapered shell is a polygon that is uniform in shape along the vertical length of the tapered shell, but monotonically reduced in area from the proximal top to the distal bottom, at least one hole penetrating the tapered shell proximate the bottom thereof, and one or more seeds, seedlings, and/or saplings contained within the tapered shell, wherein the seed planting device does not extend horizontally or vertically beyond the tapered shell.

Embodiments further include a porous or perforated lid fixed within the tapered shell above said plurality of seeds and/or seedlings.

Any of the above embodiments can further include a water-filled reservoir contained between frangible, water impermeable barriers and located within the tapered shell above the one or more seeds, seedlings, and/or saplings, the water impermeable barriers being configured to fracture upon energetic impact of the seed planting device with a forest floor, thereby allowing the water to flow downward from the reservoir to the one or more seeds, seedlings, and/or saplings.

In any of the above embodiments, the tapered shell can shaped substantially as a quadrilateral pyramid or a triangular pyramid.

In any of the above embodiments, the one or more seeds and/or seedlings and/or saplings that are contained within the tapered shell can be mixed with at least one of soil, sand, gravel, super-absorbent polymer granules, fertilizer, and water.

In any of the above embodiments, the bottom of the tapered shell can terminate in a point, or the at least one hole can include an opening at the bottom of the tapered shell.

In any of the above embodiments, the at least one hole can include at least one hole penetrating a side of the tapered shell proximate the bottom thereof.

In any of the above embodiments, the tapered shell can further comprising a weighted and pointed bottom tip. In some of these embodiments, the weighted and pointed tip is configured to be pushed away from the bottom of the tapered shell by roots growing downward from new vegetation arising from the seeds and/or seedlings and/or saplings, thereby leaving an opening in the bottom of the tapered shell.

In any of the above embodiments, the tapered shell can be made from at least one biodegradable material.

A second general aspect of the present invention is a seed planting assembly comprising a tray or common frame from which a plurality of seed planting devices according to the first general aspect extend downward, the tray or common frame being configured to press the seed planting devices into the forest floor, and then release the seed planting devices upon lifting of the tray or common frame upward.

A third general aspect of the present invention is a seed planting assembly that includes a tray or common frame from which a plurality of tapered shells according to claim 1 extend downward, and a seed chamber above the tray or common frame containing at least one of a seed, a seedling, or a sapling, wherein as the at least one of the seed, the seedling, or the sapling, germinates and/or grows, it is able to extend roots downward into a plurality of the tapered shells.

A fourth general aspect of the present invention is a method of planting vegetation in a forest floor after a forest fire that has created a hydrophobic layer on the forest floor. The method includes providing a plurality of seed planting devices according to claim 1, and dropping or propelling the plurality of seed planting devices from an aircraft onto the forest floor, such that the plurality of tapered shells penetrate through the hydrophobic layer, thereby enabling rain water to flow through the hydrophobic layer via the seed planting devices, and causing vegetation arising from the seeds and/or seedlings and/or saplings that are contained within the tapered shells to take root in soil that is beneath the hydrophobic layer.

In embodiments, the aircraft is one of a piloted helicopter, a remotely controlled winged aircraft, and a remotely controlled hovering drone.

In any of the above embodiments, the impact energy of the seed planting devices can be derived entirely from gravitational acceleration after being released from the aircraft, or the seed planting devices can be ballistically propelled from the aircraft toward the forest floor.

A fifth general aspect of the present invention is a method of planting vegetation in a forest floor after a forest fire that has created a hydrophobic layer within the forest floor. The method includes providing a plurality of seed planting devices according to the first general aspect, attaching the seed planting devices to a rigid tray, such that the tapered shells extend downward from the tray, placing the tray and seed planting devices onto the ground, such that the tray is suspended above the ground by the seed planting devices, pressing downward on the tray, thereby simultaneously pushing all of the seed planting devices into the ground, so that they penetrate through the hydrophobic layer, and removing the tray from the seed planting devices, whereby the seed planting devices remain in the ground and continue to penetrate the hydrophobic layer, thereby enabling rain water to flow through the hydrophobic layer via the seed planting devices, and causing vegetation arising from the seeds and/or seedlings, and/or saplings that are contained within the tapered shells of the seed planting devices to take root at least partially in soil that is beneath the hydrophobic layer.

In embodiments, the seed planting devices are attached to the tray by frangible gaskets that prevent the seed planting devices from gravitationally falling away from the tray, while allowing the seed planting devices to remain in the ground when the tray is removed after the seed planting devices have been pressed into the ground.

And in any of the above embodiments, pressing downward on the tray can include stepping on the tray.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is an apparatus and method for increasing absorption of rainwater into soil below a hydrophobic layer of a forest floor after a forest fire, and for introducing new ground cover into an area that has experienced a forest fire, thereby reducing the threat of mudslides and consequent erosion of the land.

Figure 1:
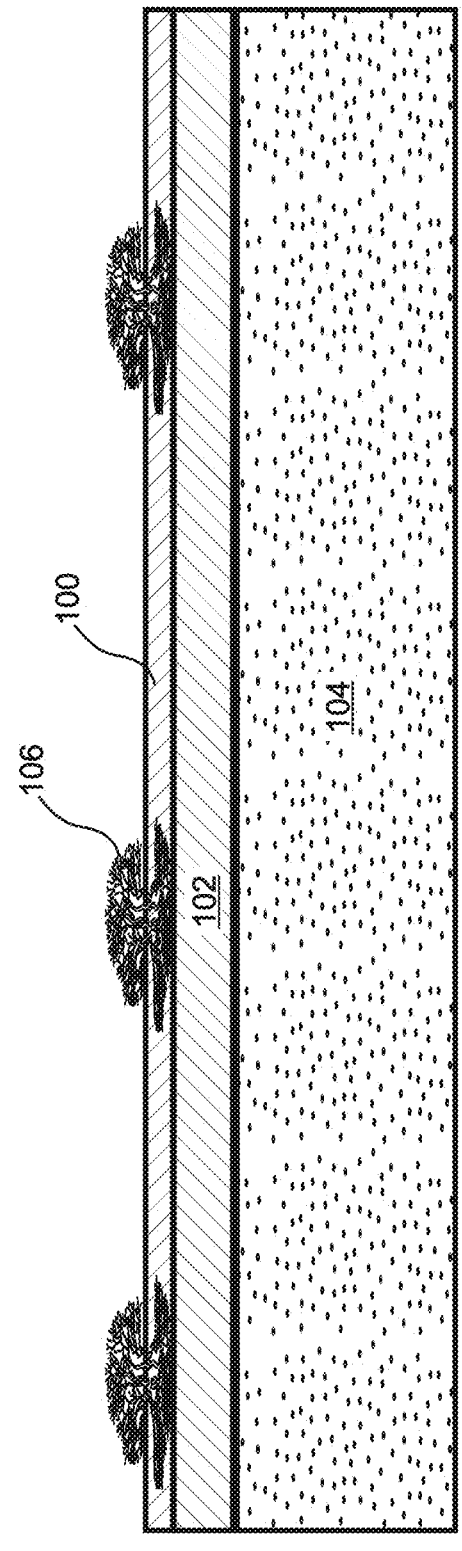
FIG. 1 is a cross section indicating a prior art method of introducing vegetation into a forest after a fire.
Figure 2A:
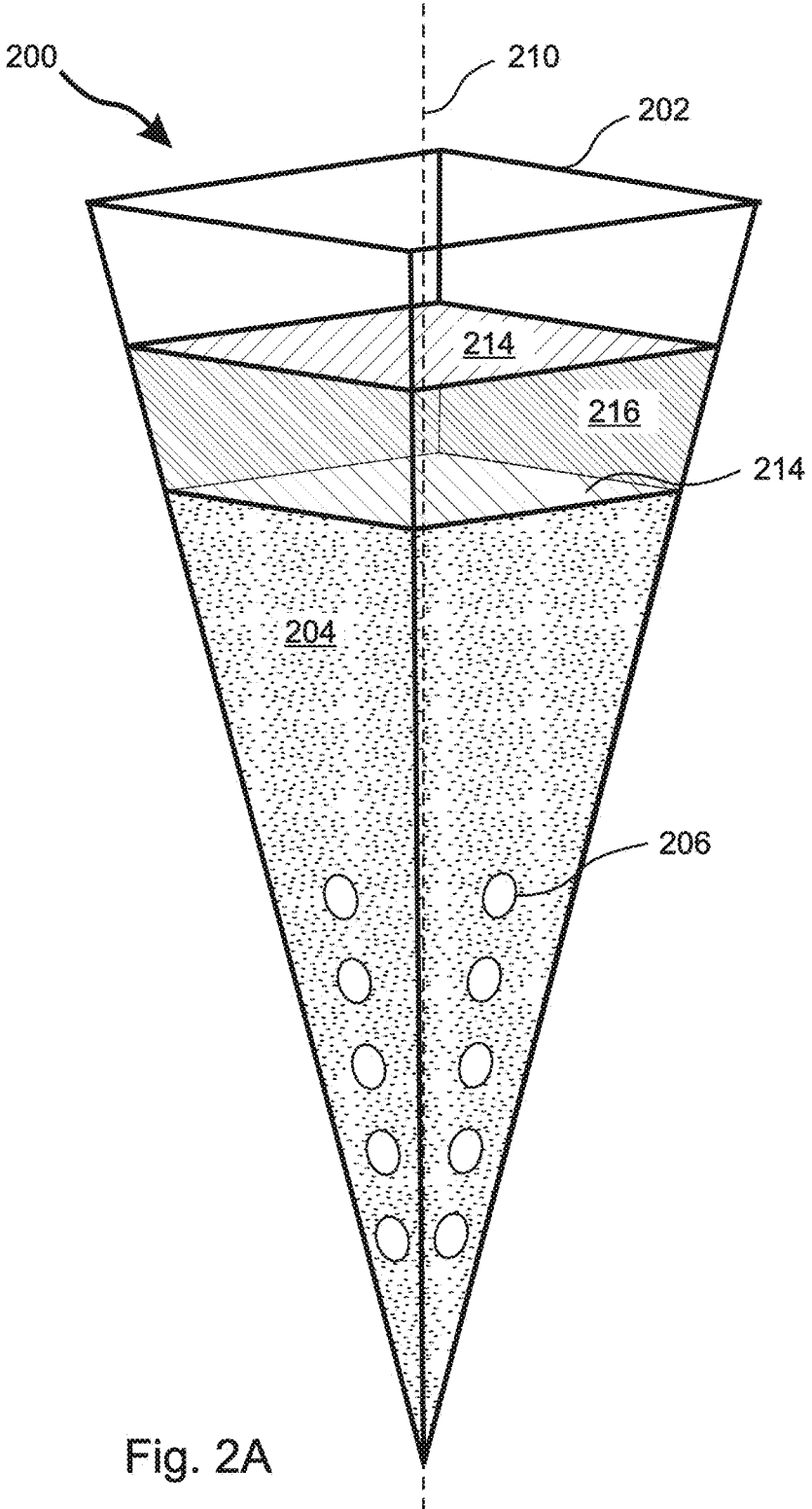
FIG. 2A is a perspective view of a seed planting device having a square cross section in an embodiment of the present invention.
Figure 2C:
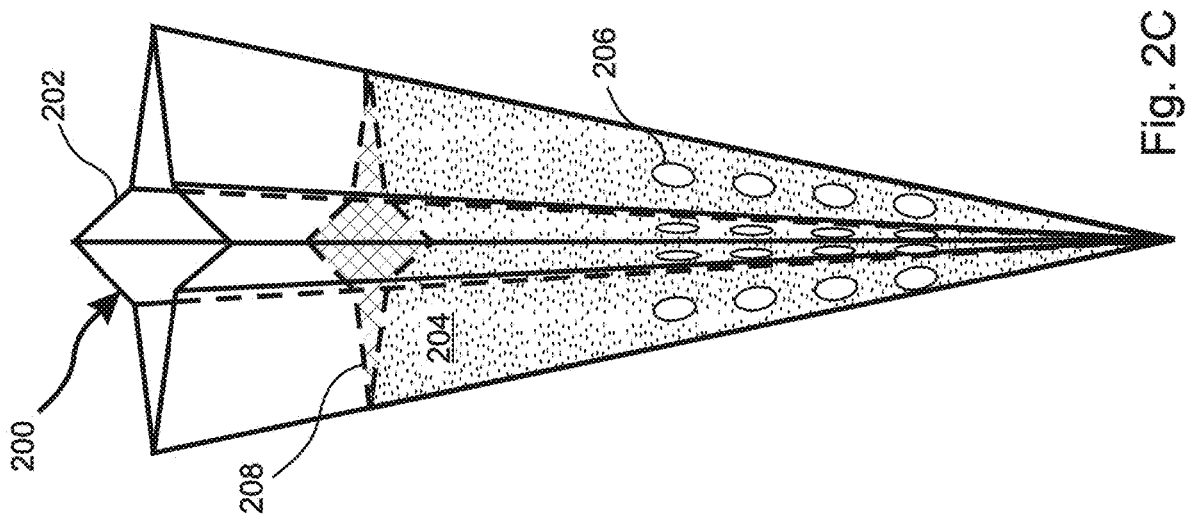
FIG. 2C is a transparent perspective view of the seed planting device of FIG. 2B.
Figure 2B:
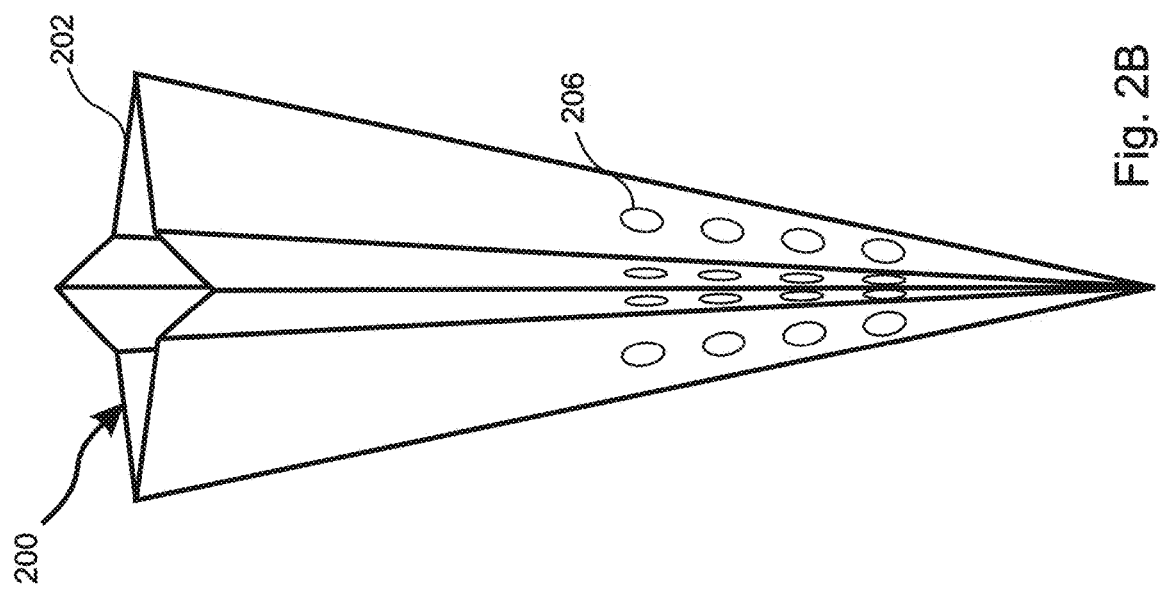
FIG. 2B is an opaque perspective view of a seed planting device having a four-pointed star-shaped cross section in an embodiment of the present invention.

With reference to FIGS. 2A-2C, the disclosed seed planting device 200 comprises a pointed or otherwise tapered outer shell 202 having a polygonal cross-section that surrounds a longitudinal axis 210 of the tapered shell 202. The polygonal cross-section of the tapered shell 202 is largest at a proximal end thereof, tapering to a smallest cross-section at a distal end thereof. In the illustrated embodiments, the cross-sectional polygon shape is symmetric about the longitudinal axis 210 and tapers to a point. It can be seen in the drawings that the tapered shell 202 extends vertically downward along a length thereof from the proximal top to the distal bottom, and that the horizontal cross-sectional shape of the tapered shell 202 is a polygon that is uniform in shape along the vertical length of the tapered shell 202, but monotonically reduced in area from the proximal top to the distal bottom. It can be further seen that the seed planting device does not extend horizontally or vertically beyond the tapered shell.

For ease of expression, the phrase "seed and soil mixture" is used herein generically to refer to one or more seeds and/or seedlings and/or saplings, combined with any mixture 204 of one or more materials such as sand, gravel, super absorbent polymer (SAP) granules, and/or soil. Similarly, the term "tapered shell" is used herein generically and irrespective of the polygonal cross-sectional shape of the tapered shell 202, unless otherwise required by context.

In the embodiment of FIG. 2A, the cross-sectional shape of the tapered shell 202 is square, such that the tapered shell 202 is shaped as a downward pointing quadrilateral pyramid. In the embodiment of FIGS. 2B and 2C, the cross-section of the tapered shell 202 is shaped as a star. In the illustrated embodiments, at least one opening 206 is provided at or near the distal end of the tapered shell 202 through which water can seep, while being small enough to prevent significant loss of the seed and soil mixture 204. In FIG. 2A the tapered shell 202 is shown as if it were transparent, so that its contents can be viewed. FIGS. 2B and 2C are respective opaque and transparent views of the illustrated embodiment.

The embodiment of FIG. 2A further includes a reservoir filled with water 216 located between two water-impermeable frangible barriers 214. The barriers 214 are configured to confine the water 216 before deployment of the seed planting device 200, and to rupture upon impact of the seed planting device 200 with the ground, so that the water 216 can flow into the seed and soil mixture 204, and so that water from any subsequent rainfall can enter and flow through the seed planting device 200.

In the embodiments of FIGS. 2B-2C, the seed planting device 200 includes a perforated or porous lid or screen 208, such as a wire screen or porous fabric, that is fixed within the interior of the tapered shell 202 and located above the contained seed and soil mixture 204. The openings in the lid 208 are small enough to prevent any significant amount of the seed and soil mixture 204 from being ejected through the top of the tapered shell 202 upon impact with the forest floor 300, while being large enough to allow water to pass through the lid 208 and into the tapered shell 202.

The porous lid 208 can be made from a frangible material, such as a sheet of cellulose, such that germinating and growing plant life can burst upward through the lid, or the holes in the lid 208 can be large enough to allow the stems or branches to pass through. In some embodiments the lid 208 is spaced above the upper surface of the seed and soil mixture 204, and thereby provides partial shade to newly germinated seedlings or saplings as they extend above the seed and soil mixture 204 within the tapered shell 202 until the seedlings have grown sufficiently to pierce or pass through the lid.

The lid 208 can be fixed to the tapered shell 202 by any attachment means known in the art, including by an adhesive, by a fastener such as a rivet or screw, by press-fit, or by tabs that extend from the lid into indentations provided in the tapered shell 202. In some embodiments, the lid 208 is perforated only in a central region thereof, for example in cases where the tapered shell 202 is relatively large as compared to the seedling or sapling that will emerge after germination. A larger tapered shell 202 might be implemented, for example, to increase the weight and perforating power of the seed planting device 200.

Figures 2D, 2E, 2F, 2G, 2H:
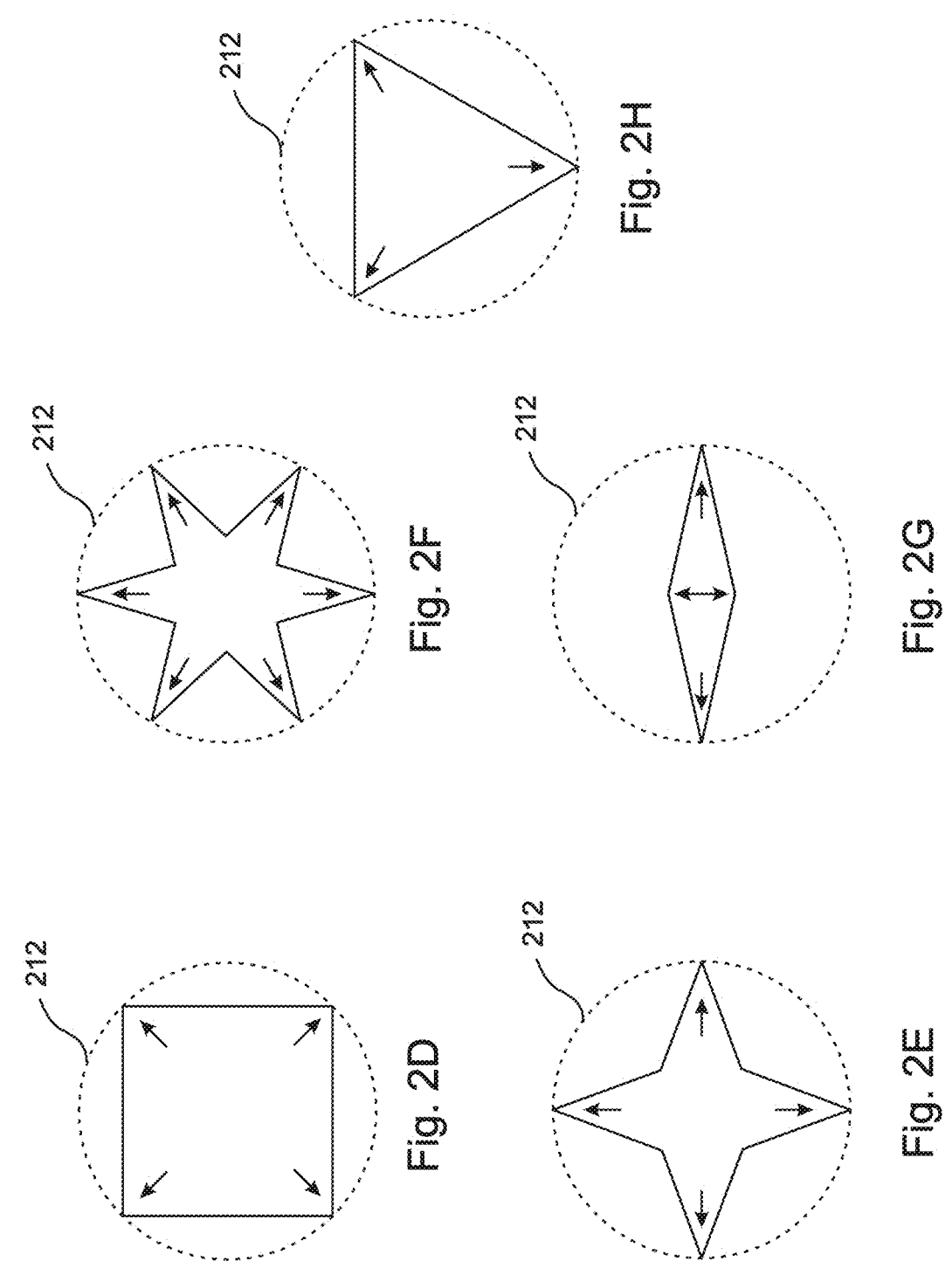
FIG. 2D is a cross-sectional view of an embodiment of the present invention having a square shape in cross section.
FIG. 2E is a cross-sectional view of an embodiment of the present invention having a four-pointed star shape in cross section.
FIG. 2F is a cross-sectional view of an embodiment of the present invention having a six-pointed star shape in cross section.
FIG. 2G is a cross-sectional view of an embodiment of the present invention having a diamond shape in cross section.
FIG. 2H is a cross-sectional view of an embodiment of the present invention having a triangular shape in cross section.

FIGS. 2D-2H are cross sections of the tapered shells 202 of various embodiments of the invention. In FIG. 2D, the cross-section is square, and corresponds with the embodiment of FIG. 2A. In FIG. 2E, the cross-section is star-shaped, and corresponds with the embodiment of FIGS. 2B-2C. FIG. 2F is a cross section of an embodiment having a star-shaped cross section with more "points" than FIG. 2E.

FIG. 2G is a cross section of an embodiment having a cross section shaped as a flattened square or diamond, and FIG. 2H is a cross section of an embodiment having a triangular cross section, such that the tapered shell 202 is shaped as a downward-pointing triangular pyramid.

In each of FIGS. 2D-2H, the cross-sectional shape is shown for comparison as being circumscribed within a circle 212, which would be the cross section of a downward pointing cone. While a tapered cone maximizes the internal volume of the seed planting device 200, it can be seen in the figures that as the cone penetrated downward, it would apply outward (horizontal) forces to the hydrophobic layer uniformly in all directions. In contrast, the polygonal cross sections of FIGS. 2D-2H focus the lateral force applied to the hydrophobic layer into concentrated regions proximate the radially outward extending corners of the tapered shell 202 cross section, as is indicated by the radially outward facing arrows in the drawings, thereby fracturing and breaking through the hydrophobic layer with greater efficiency.

Figure 2I:
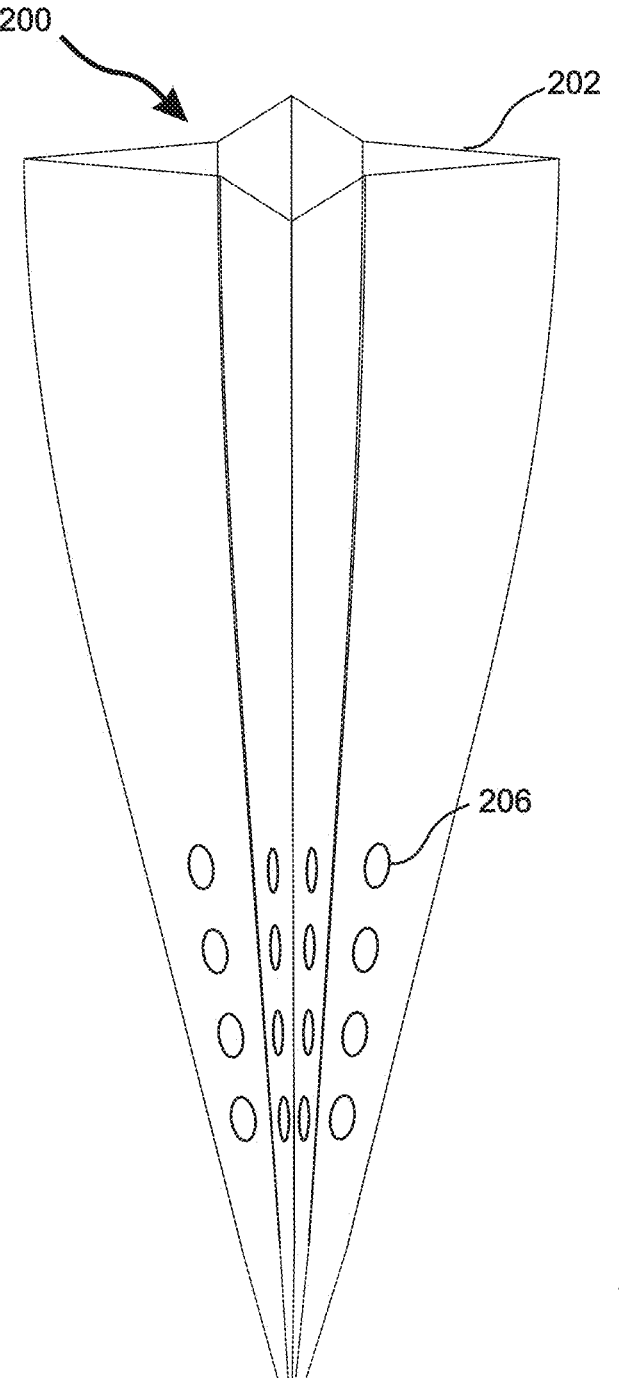
FIG. 2I is an opaque, perspective view of an embodiment similar to FIG. 2A, but wherein the tapering of the cross-section is not uniform over the length of the tapered shell.

FIG. 2I is a perspective view of an embodiment that is similar to FIG. 2B, but in which tapering of the cross-section is not uniform over the length of the tapered shell 202. According to this approach, the sharply pointed distal portion provides optimal penetrating power, while the more gradually tapered proximal portion provides an enhanced containment volume for the seed and soil mixture 204.

Figure 3:
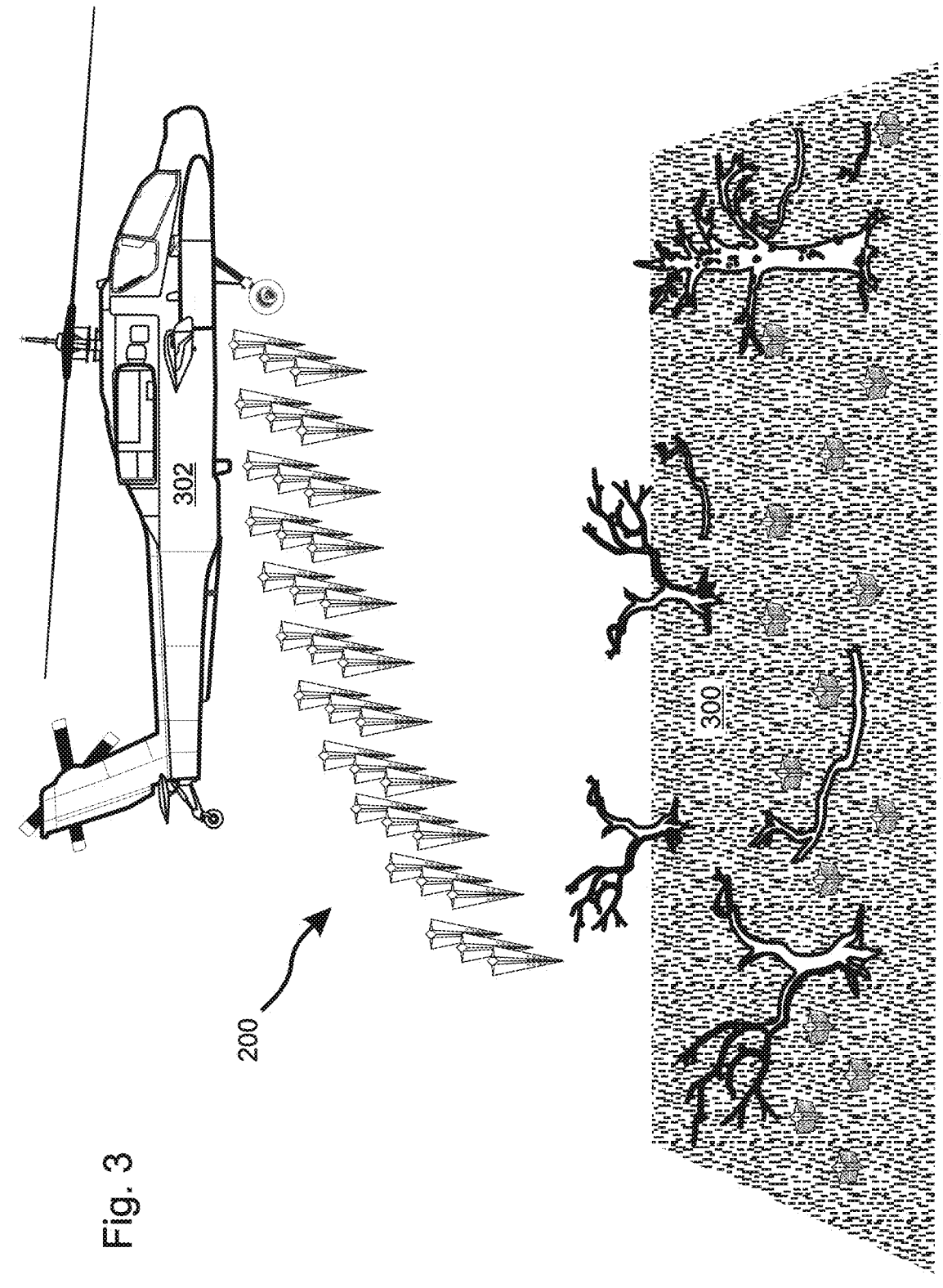
FIG. 3 illustrates dropping of a plurality of the seed planting devices of FIG. 2B onto a forest floor after a fire.

With reference to FIG. 3, in embodiments of the disclosed method, after a forest fire a plurality of the seed planting devices 200 are treated as seeding projectiles, in that they are dropped or propelled onto and into the forest floor 300 from an aircraft 302. The aircraft 302 can include a global positioning system and/or a wind direction and speed sensor so as to more accurately drop or propel the projectiles 200 to the desired locations. In the embodiment of FIG. 3, the projectiles 200 are dropped from a piloted helicopter 302. In other embodiments, the aircraft can be a remote-controlled winged aircraft or a remotely controlled drone.

Figure 4A:
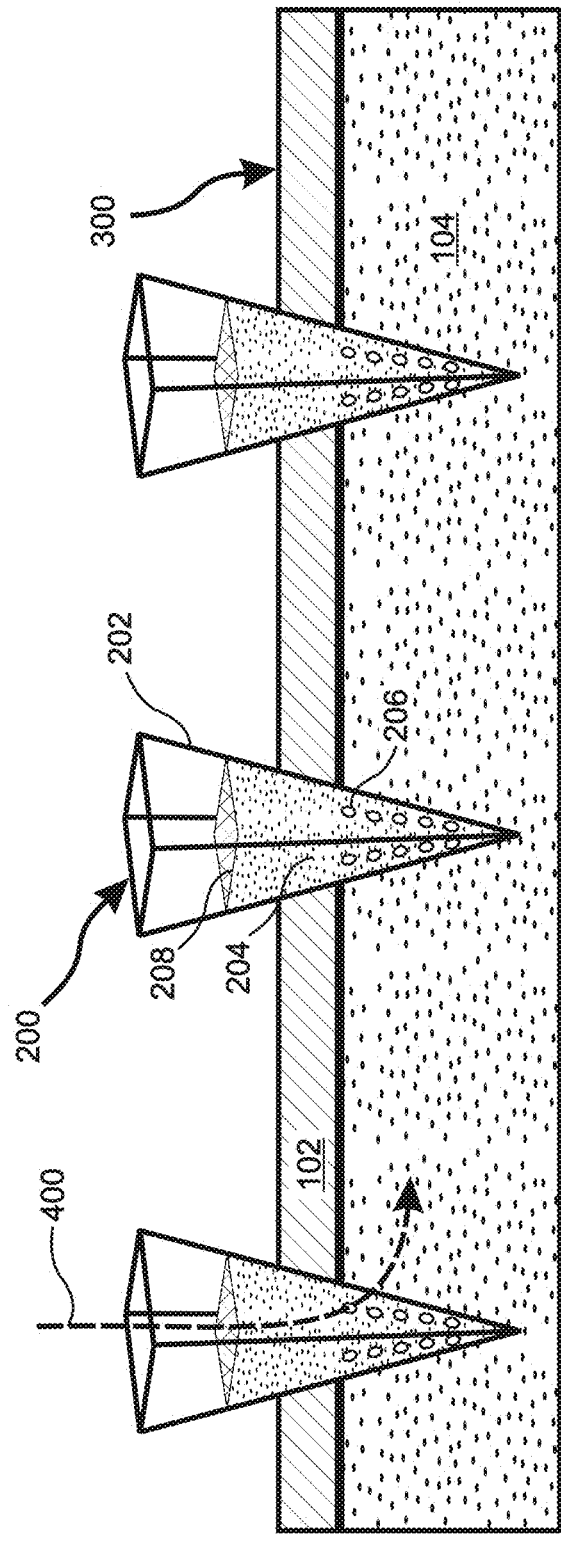
FIG. 4A is a cross-sectional view illustrating penetration of the seed planting devices of FIG. 2A into the forest floor.

With reference to FIG. 4A, which is directed to the embodiment of FIG. 2A, the shape and weight of the seed planting devices 200 causes them to impact the forest floor 300 with sufficient energy to penetrate into the ground through the hydrophobic layer 102, thereby allowing rainwater to seep into and through the tapered shells 202, and out through the openings 206 near the bottom of the tapered shells 202 into the underlying soil 104, as is indicated 400 in the drawing. As a result, rainwater is less likely to pool on top of the hydrophobic layer 102, and is thereby less likely to cause downhill floods and mudslides. In some of these embodiments, the impact energy of the seed planting devices 200 is derived entirely from gravitational acceleration, while in other of these embodiments the seed planting devices 200 are energetically propelled toward the forest floor 300, for example by a compressed gas or a chemical explosive.

Figure 4B:
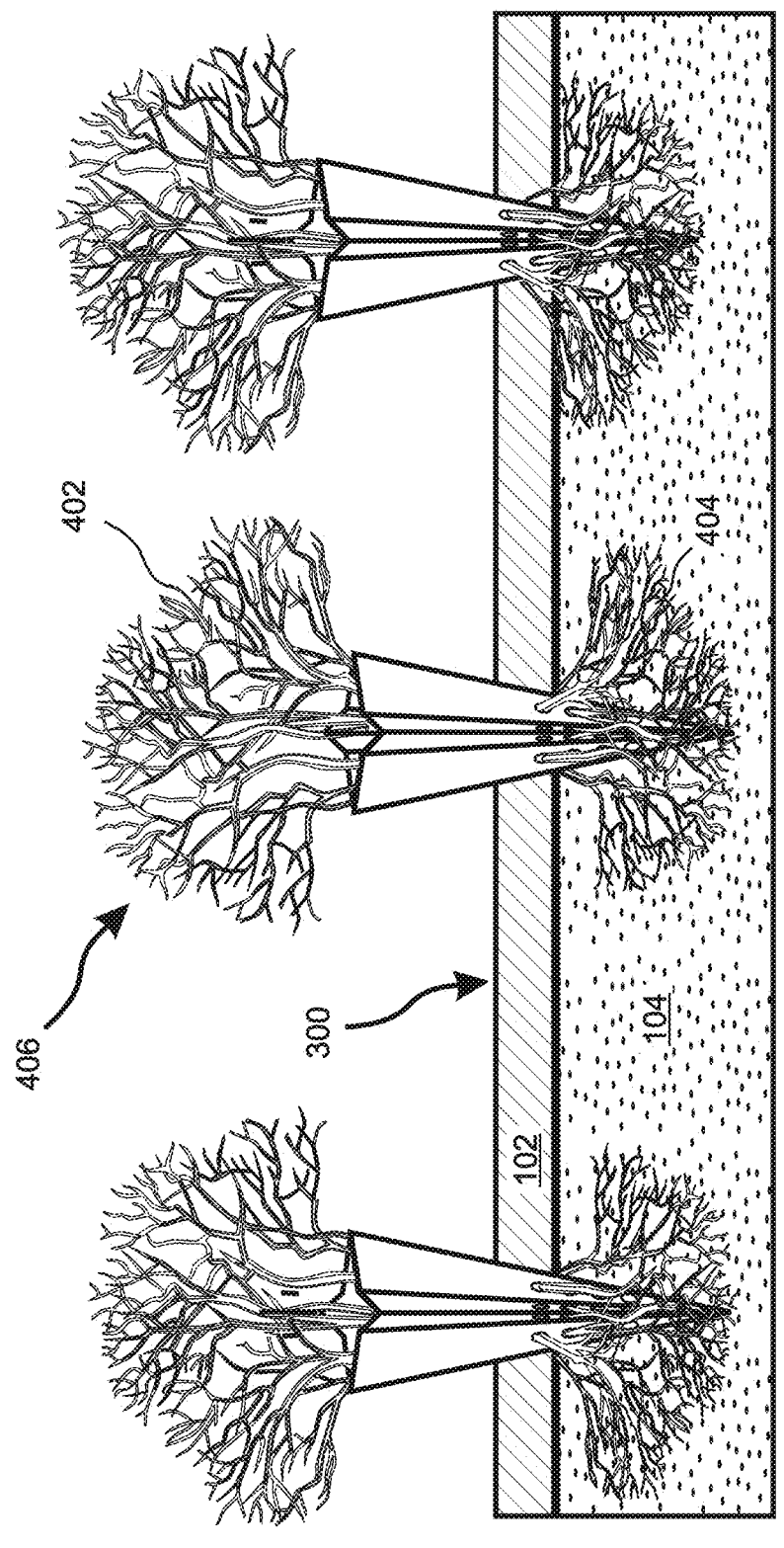
FIG. 4B illustrates the growth of vegetation and the penetration of roots into the soil below the hydrophobic layer that arises from germination and/or growth of the seeds and/or seedlings delivered by the seed planting devices of FIG. 2B.

With reference to FIG. 4B, which is directed to the embodiment of FIGS. 2B and 2C, upon germination of the seeds and/or seedlings within the tapered shell 202, the roots 404 of the new ground cover 406 grow out through the openings 206 provided at or near the bottom of the tapered shell 202 and into the soil 104 that is beneath the hydrophobic layer 102, thereby anchoring the new vegetation 402 to the underlying soil layer 104, and further reducing the threat of mudslides.

Figure 5B:
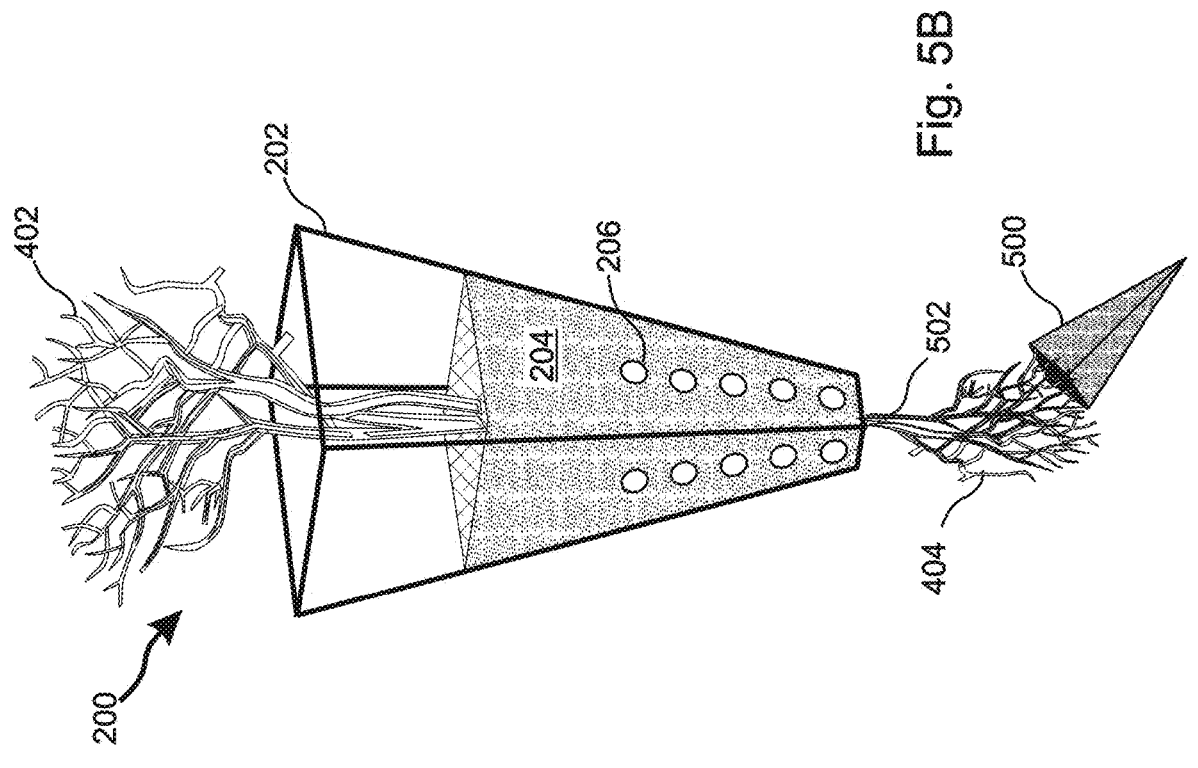
FIG. 5B is a perspective view of the seed planting device of FIG. 5A, shown after deployment of the seed planting device, wherein sprouted roots have pushed the weighted tip away from the remainder of the tapered shell.
Figure 5A:
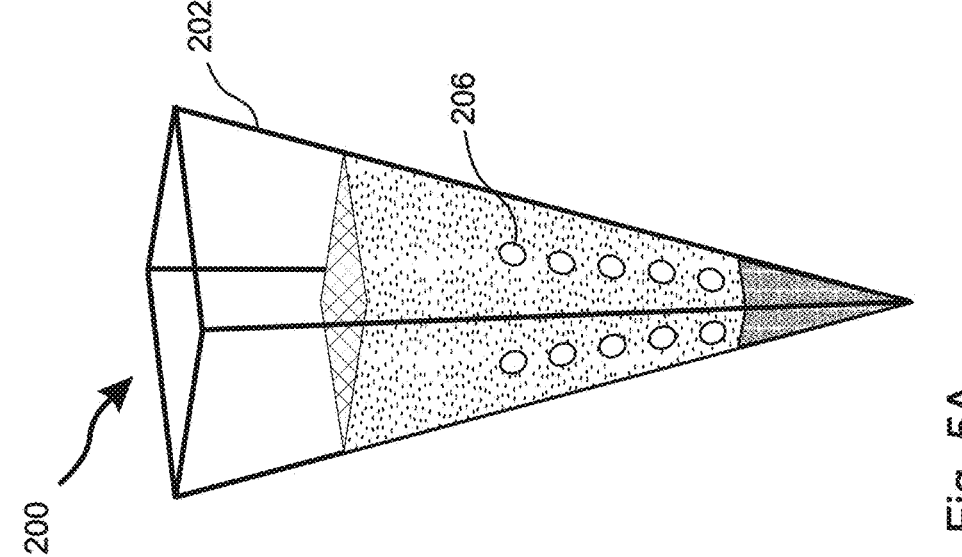
FIG. 5A is a perspective view of a seed planting device similar to FIG. 2A, but including a weighted tip at the bottom thereof, the seed planting device being shown before deployment thereof.

With reference to FIG. 5A, in some embodiments the tapered shell 202 is terminated by a weighted and hardened tip 500 that provides additional weight, energy, and penetrating power to the seed planting device 200. With reference to FIG. 5B, in some of these embodiments, the tip 500 is designed to be pushed away from the tapered shell 202 by the growing roots 404 of the new vegetation 402, and/or to rapidly biodegrade after impact with the forest floor 300, thereby providing an opening 502 in the bottom of the tapered shell 202 through which water and roots 404 can penetrate.

Figure 6A:
FIG. 6A is a partially exploded perspective view of a seed planting assembly comprising a frame and seed chamber that can allow one or more seedlings or saplings to extend roots simultaneously through a plurality of tapered shells according to an embodiment of the present invention.

With reference to FIG. 6A, in various embodiments a seed planting assembly comprises a plurality of tapered shells 202 mounted such that they all extend downward from a common frame 600, where the tops of the tapered shells 202 extend to openings 606 in the common frame 600. In these embodiments, the tapered shells 202 can be empty, or can be filled with any material or mixture of materials, such as sand, gravel, soil, SAPs, and fertilizer, that are conducive to the growth of vegetation. However, in some of these embodiments the tapered shells 202 do not contain seeds or seedlings. Instead, in these embodiments a single seed or seedling 604, or a plurality of seeds and seedlings, are included in a seed and soil mixture provided in an upper chamber 602 that extends upward from the frame 600. In FIG. 6A, the upper chamber 602 is shown positioned above the frame 600, so that the relationship between the frame 600 and the upper chamber 602 can be more clearly discerned. The weight of this seed planting assembly is sufficient to cause all of the tapered shells 202 to penetrate through the hydrophobic layer 102, due to gravity and/or ballistic propulsion.

Figure 6B:
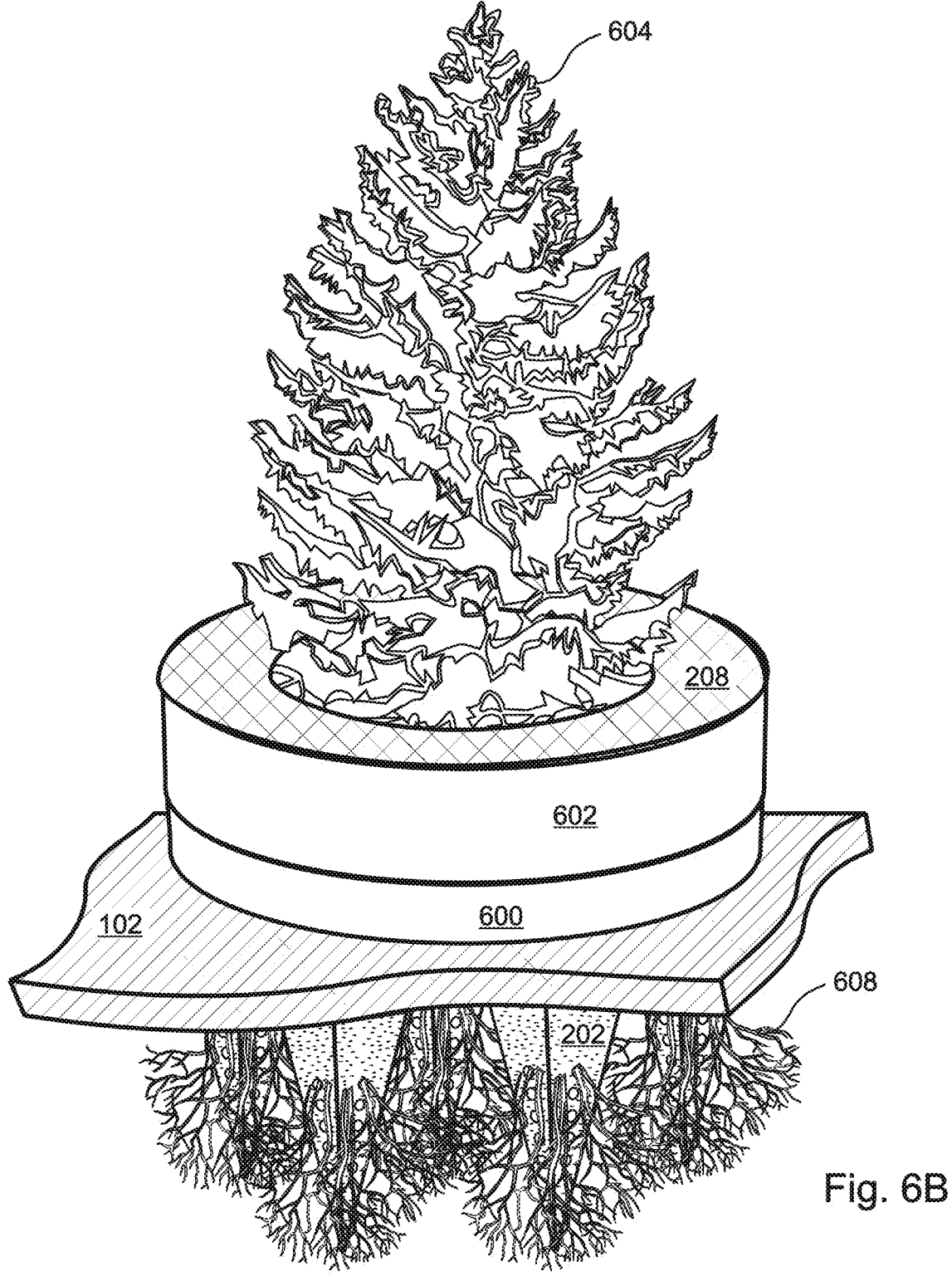
FIG. 6B is a perspective view of the frame and seed chamber of FIG. 6A, shown after a single sapling has burst through the lid of the seed chamber and extended roots through all of the tapered shells.

With reference to FIG. 6B, these embodiments can enable a larger plant 604 to be established, such as a sapling 604 that is intended to replace a burned tree of the forest, because the roots 608 of the plant 604 can extend simultaneously through all of the plurality of tapered shells 202, thereby establishing a larger root system 608 than might be possible for a plant that is germinated within a single tapered shell 202. Note that in FIGS. 6A and 6B, the upper screen 208 is frangible, and has been penetrated by the growing sapling or other plant 604.

Figure 7A:
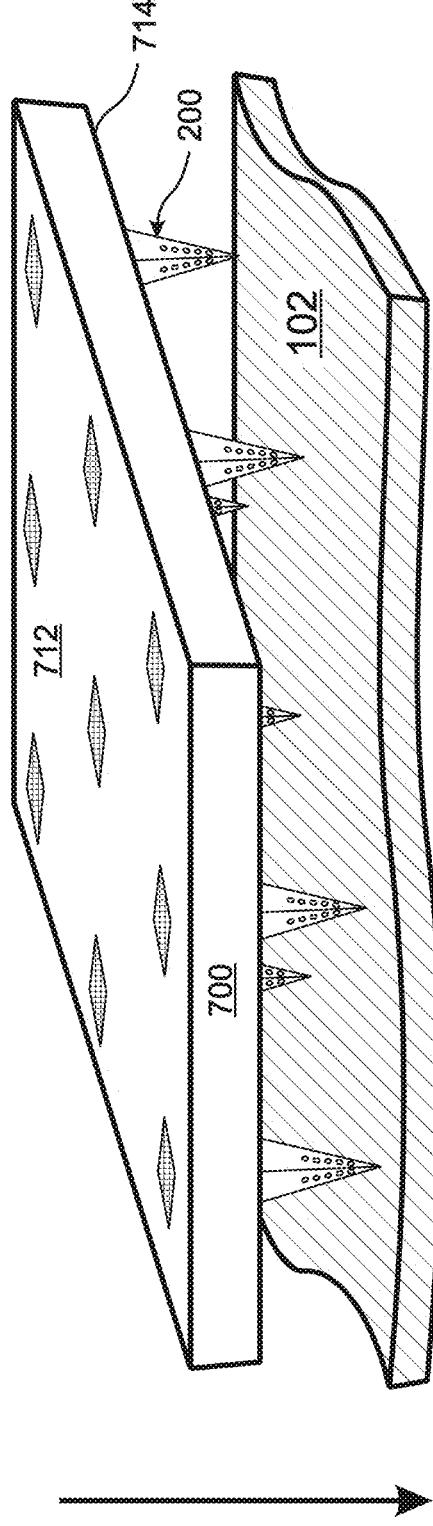
FIG. 7A is a perspective view of a tray to which a plurality of seed planting devices according to FIG. 2A are mounted for manual, simultaneous deployment through the hydroscopic layer.
Figures 7B, 7C:
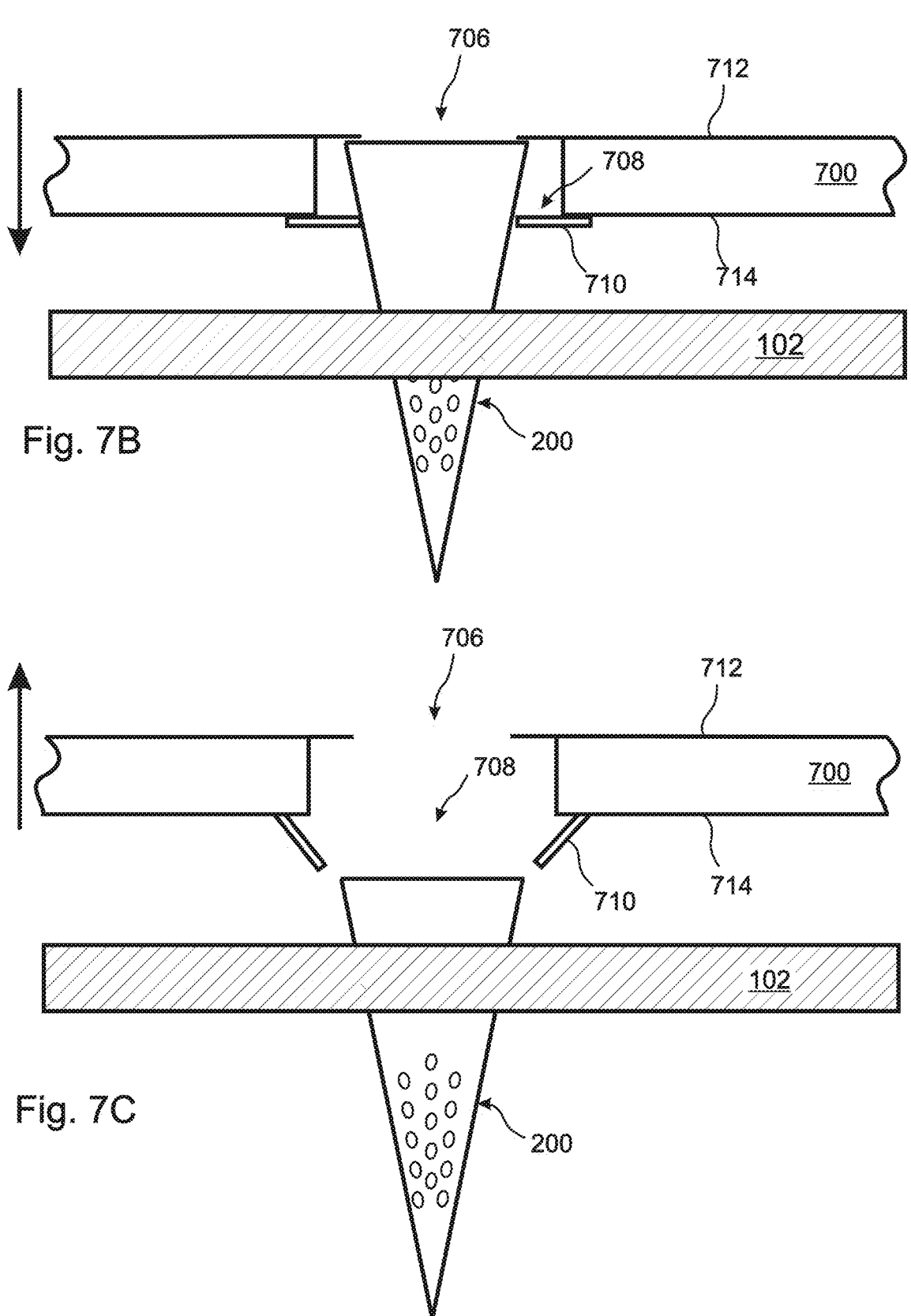
FIG. 7B is a cross-sectional view of one of the seed planting devices of FIG. 7A illustrating a structure that is able to retain the seed planting devices in the tray before deployment, and release them after deployment.
FIG. 7C is a cross-sectional view of the seed planting device and retaining structure of FIG. 7B, illustrating release of the seed planting device from the tray after deployment of the seed planting device.

With reference to FIG. 7A, in other embodiments of the disclosed method, the seed planting devices 200 are pressed into the soil 102 by personnel on the ground. As is illustrated in FIG. 7B, in some of these embodiments a plurality of the seed planting devices 200 are mounted to a rigid tray 700, such that the seed planting devices 200 extend below the tray 700. By placing the tray 700 with seed planting devices 200 onto the ground 102, such that the points of the tapered shells 202 rest on the ground 102 and support the tray 700, all of the seed planting devices 200 can be simultaneously pressed onto the soil 102, for example by stepping on the tray 700.

With reference to FIG. 7B, in the illustrated embodiment the tray 700 has a top 712 and a bottom 714 that are penetrated by concentric, overlapping holes 706, 708, wherein the upper holes 706 in the top 712 are smaller in diameter than the tops of the tapered shells 202, thereby ensuring that the seed planting devices 200 will be pushed downward by the tray 704 into the soil when the tray 704 is pressed downward.

The lower holes 708 formed in the bottom 714 of the tray 700 are larger in diameter than the tops of the tapered shells 202. Before deployment of the seed planting devices 200, they are preventing from falling out through the larger holes 708 by frangible gaskets 710, made for example from cardboard, that are sufficiently strong to keep the seed planting devices 200 from falling through the larger holes 708 solely due to gravity. With reference to FIG. 7C, the frangible gaskets 710 are configured to give way and allow the seed planting devices 200 to pass through the larger holes 708 when the tray 700 is lifted up and away from the ground 102 after the seed planting devices 200 have been pressed into the ground 102, thereby allowing the seed planting devices 200 to remain behind in the ground 102. The frangible gaskets 710 can be attached to the bottom 714 of the tray 704 by any convenient means, such as by rivets or screws, or by an adhesive.

In embodiments, the tapered shells 202 and/or lids 208 and/or other components of the present invention are made from one or more biodegradable materials, such as from AshCrete™ (a concrete alternative comprising a mixture of fly ash, borate, bottom ash, and a chlorine compound), hempcrete clay, Timbercrete™ (a masonry product containing a blend of cellulose, cement, sand, and binders), bamboo, recycled wood, and/or other recycled materials, so that after the danger of mudslides has abated, the seed planting devices 200 can partially or fully biodegrade and blend into the soil.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

I claim:

1. A seed planting device comprising:
a tapered shell extending downward along a vertical length thereof from a proximal top to a distal bottom, wherein a horizontal cross-sectional shape of the tapered shell is uniform in shape along the vertical length of the tapered shell, but monotonically reduced in area from the proximal top to the distal bottom;
at least one hole penetrating the tapered shell proximate the bottom thereof;
one or more seeds, seedlings, and/or saplings contained within the tapered shell; and
a water-filled reservoir contained between frangible, water impermeable barriers and located within the tapered shell above the one or more seeds, seedlings, and/or saplings, the water impermeable barriers being configured to fracture upon energetic impact of the seed planting device with a forest floor, thereby allowing the water to flow downward from the reservoir to the one or more seeds, seedlings, and/or saplings.

2. The seed planting device of claim 1, further comprising a porous or perforated lid fixed within the tapered shell above said plurality of seeds and/or seedlings.

3. The seed planting device of claim 1, wherein the tapered shell is shaped substantially as a quadrilateral pyramid or a triangular pyramid.

4. The seed planting device of claim 1, wherein the one or more seeds and/or seedlings and/or saplings that are contained within the tapered shell are mixed with at least one of soil, sand, gravel, super-absorbent polymer granules, fertilizer, and water.

5. The seed planting device of claim 1, wherein the bottom of the tapered shell terminates in a point.

6. The seed planting device of claim 1, wherein the at least one hole includes an opening at the bottom of the tapered shell.

7. The seed planting device of claim 1, wherein the at least one hole includes at least one hole penetrating a side of the tapered shell proximate the bottom thereof.

8. The seed planting device of claim 7, wherein the weighted and pointed tip is configured to be pushed away from the bottom of the tapered shell by roots growing downward from new vegetation arising from the seeds and/or seedlings and/or saplings, thereby leaving an opening in the bottom of the tapered shell.

9. The seed planting device of claim 1, wherein the tapered shell further comprising a weighted and pointed bottom tip.

10. The seed planting device of claim 1, wherein the tapered shell is made from at least one biodegradable material.

11. The seed planting device of claim 1, wherein the horizontal cross-sectional shape of the tapered shell is a polygon.

12. A seed planting assembly comprising a tray or common frame from which a plurality of seed planting devices according to claim 1 extend downward, the tray or common frame being configured to press the seed planting devices into the forest floor, and then release the seed planting devices upon lifting of the tray or common frame upward.

13. A seed planting assembly comprising:
a tray or common frame from which a plurality of tapered shells according to claim 1 extend downward; and
a seed chamber above the tray or common frame containing at least one of a seed, a seedling, or a sapling;
wherein as the at least one of the seed, the seedling, or the sapling, germinates and/or grows, it is able to extend roots downward into a plurality of the tapered shells.

14. A method of planting vegetation in a forest floor after a forest fire that has created a hydrophobic layer on the forest floor, the method comprising:
providing a plurality of seed planting devices according to claim 1; and
dropping or propelling the plurality of seed planting devices from an aircraft onto the forest floor, such that the plurality of tapered shells penetrate through the hydrophobic layer, thereby enabling rain water to flow through the hydrophobic layer via the seed planting devices, and causing vegetation arising from the seeds and/or seedlings and/or saplings that are contained within the tapered shells to take root in soil that is beneath the hydrophobic layer.

15. The method of claim 14, wherein the aircraft is one of a piloted helicopter, a remotely controlled winged aircraft, and a remotely controlled hovering drone.

16. The method of claim 14, wherein the impact energy of the seed planting devices is derived entirely from gravitational acceleration after being released from the aircraft.

17. The method of claim 14, wherein the seed planting devices are ballistically propelled from the aircraft toward the forest floor.

18. A method of planting vegetation in a forest floor after a forest fire that has created a hydrophobic layer within the forest floor, the method comprising:

providing a plurality of seed planting devices according to claim 1;

attaching the seed planting devices to a rigid tray, such that the tapered shells extend downward from the tray;

placing the tray and seed planting devices onto the ground, such that the tray is suspended above the ground by the seed planting devices;

pressing downward on the tray, thereby simultaneously pushing all of the seed planting devices into the ground, so that they penetrate through the hydrophobic layer; and removing the tray from the seed planting devices, whereby the seed planting devices remain in the ground and continue to penetrate the hydrophobic layer, thereby enabling rain water to flow through the hydrophobic layer via the seed planting devices, and causing vegetation arising from the seeds and/or seedlings, and/or saplings that are contained within the tapered shells of the seed planting devices to take root at least partially in soil that is beneath the hydrophobic layer.

19. The method of claim 18, wherein the seed planting devices are attached to the tray by frangible gaskets that prevent the seed planting devices from gravitationally falling away from the tray, while allowing the seed planting devices to remain in the ground when the tray is removed after the seed planting devices have been pressed into the ground.

20. The method of claim 18, wherein pressing downward on the tray includes stepping on the tray.

\* \* \* \* \*